Patented Oct. 11, 1927.

1,645,415

UNITED STATES PATENT OFFICE.

JOSEPH M. COFFEY, OF SCHENECTADY, NEW YORK, ASSIGNOR TO MICA INSULATOR COMPANY, OF NEW YORK, N. Y., A CORPORATION OF NEW JERSEY.

MICA-PLATE COMPOSITION.

No Drawing. Application filed April 5, 1927. Serial No. 181,264.

My invention relates to mica plate or pasted mica, which is an insulating material made up of very thin splittings of mica bound together by cement and my invention comprises a new composition of mica plate having novel and improved characteristics including characteristics which enable shaped insulators to be molded therefrom which are superior to any prior shaped mica insulators.

Mica plate manufactured essentially in accordance with the disclosure of patent to Dyer No. 483,646, dated October 4, 1892, has been widely manufactured and used. Improvements directed to making the process more automatic have been adopted, but the great bulk of the mica plate made since 1893 has employed shellac as the cement or paste and has had the resulting characteristics of the product of said patent. In making shaped insulators from such material the process disclosed in the Jefferson Patent No. 483,653, dated October 4, 1892, has been generally employed and the resulting shaped insulator has had all the characteristics of that patent.

Recently another composition of mica plate, that disclosed in Barringer & Peterson Patent No. 1,589,094, dated June 15, 1926, has gone into considerable use. In this material the cement or binder is a resin of the polyhydric alcohol-polybasic acid type. This material is superior to the older mica plate material principally in that the binder distributed throughout the laminations of the composite material has electric insulating properties greater than those of shellac, in that its products of combustion also have superior insulating properties to those of the products of combustion of shellac, and in that the binder will withstand a much higher temperature than shellac before it begins to deteriorate. On the other hand, the material which includes the described resin is markedly inferior to that employing shellac in the respect that it is less readily moldable and the final product is less flexible and cannot be stamped cleanly to produce notched pieces and the like. These are characteristics which are necessary for many uses and have made it necessary to continue the use of the older product, or to compromise as far as possible by employing a binder composed of a mixture of shellac and the described resin.

My novel composition of mica plate is characterized (1) by such combination of the qualities above described as to give it all the superior qualities of each, (2) by the yieldingness and flexibility of the cement in the finished product which enables the finished material to conform itself more readily to machine parts to which it is to be secured, (3) by the relatively small proportion of cement employed in the shaped product, which is thus more nearly pure mica, and (4) by a much less tendency of the cement to ooze from the material when subjected to heat and/or pressure. Specifically my novel product is obtained when the mica splittings are cemented together by a properly treated resin resulting from condensation reaction of glycerol and phenol, or its homologues.

My novel composite insulation cannot be illustrated by any drawing in such manner as to distinguish it from the prior products, but will be readily understood from the following description.

I first prepare the cement of the type mentioned and reduce it to a fluid condition by dissolving it in a suitable solvent. This may be done, for example, by reacting together about ten parts by weight of crystal phenol and seven parts by weight of glycerol in the presence of a very small amount of strong sulphuric acid. A suitable proportion is about ten cubic centimeters of strong sulphuric acid to each kilogram of phenol. The mixture is heated, the temperature being held somewhere between 160° and 190° C. The water formed by the reaction should be fractionated off and any phenol carried over during the reaction should preferably be separated from the water and returned to the vessel in which the reaction is being carried on. The reaction is suitably complete when about three and one-half parts by weight of water has been distilled. The vessel is then allowed to cool somewhat and the acid is neutralized with a suitable base such as a carbonate of sodium. The material at this point is a dark rubbery mass. It is quite different in physical character from shellac, which is in the form of buttons or flakes of a firm but brittle material and from the resin of the polyhydric alcohol-polybasic type, which is a hard fused mass requiring grinding to a powered state before it is in suitable condition for being acted upon by solvents.

To get the best results, care must be taken in selecting the materials for this type of resin and their proportions and in controlling the reaction and its duration so that the materials will have the proper characteristics. Unless there in an excess of phenol the resin may be too rubbery and not be completely soluble. An excess of glycerol will in addition to making the material too soft and rubbery, also detrimentally affect its dielectric qualities. Moreover, the reaction should not be carried on so long that the material becomes too hard to have the desired elasticity.

The rubbery material above described is then dissolved in a suitable solvent, such as alcohol, and is in this state applied to the mica splittings.

Various methods for applying the cement to the mica scales are well known, and it is immaterial to my present invention whether the cement is applied by ordinary hand methods to each scale or in other ways applied thereto, it being of course essential that there should be a thin film of the cement joining the surfaces of the different splittings.

The composite material thus far produced is then subjected to heat and pressure. I have found that a pressure of about one thousand lbs. per square inch with a temperature of about 140° C are suitable conditions. This treatment by pressure and heat does not apparently polymerize the cement and harden it as is the case with the polyhydric alcohol-polybasic acid resin cement, nor harden it as in the case of shellac, but seems to merely eliminate the solvent and distribute the binder more uniformly between the splittings.

The ideal mica plate is one which has as nearly as possible the dielectric and heat-resistant properties of pure mica, while being slightly flexible when cold and capable of being molded while hot to any desired shape. In prior compositions it has been necessary to provide from 10% to 12% of the binder when the material was to be formed into shapes, but with my novel material I am able to provide the requisite moldability with only about five percent, thus much more nearly approaching the desired ideal.

Because this cement has the property of firmly attaching itself to mica, a property found in very few known materials, because it gives to the finished material the best of the qualities of the two older compositions of mica plate, because of the elastic character of the binder in the finished plate which results in a plate that is thoroughly firm but less hard than the older plates, because for the same reason molded shapes, such as rings and commutator cones, can be produced which is much more nearly pure mica than the older plates, and because of the lessened liability of the oozing of cement from the finished product, my new composition is usable for all the purposes for which mica plate has been heretofore used and is superior to any prior product of this class.

In molding the material to form rings, cones for commutators or any other desired shape, I practice the usual practice of molding under heat and pressure, followed by chilling in the mold.

Having thus fully described my invention, what I claim and desire to protect by Letters Patent is:

1. An insulating material composed of thin mica splittings bound together by a reaction product of phenol and glycerol.

2. An insulating material composed of thin mica splittings and a phenol-glycerol resin binder in the proportion of about 95% and 5% respectively by weight, the material having when hot the capacity to be molded into shapes, such as rings, cones and the like and retaining such shape when cooled.

3. An insulating material composed of thin mica splittings bound together by a condensation product of phenol and glycerol having the proportions to produce a highly dielectric and heat resistant resin and reacted together to the stage where the material is still elastic or rubbery.

In testimony whereof, I have signed my name to this specification.

JOSEPH M. COFFEY.